United States Patent [19]

Hrishikesan

[11] 4,045,537

[45] Aug. 30, 1977

[54] PROCESS FOR RECOVERING SODA AND ALUMINA VALUES FROM RED MUD

[75] Inventor: Kizhakke G. Hrishikesan, Little Rock, Ark.

[73] Assignee: Reynolds Metals Company, Richmond, Va.

[21] Appl. No.: 730,952

[22] Filed: Oct. 8, 1976

Related U.S. Application Data

[63] Continuation of Ser. No. 593,109, July 3, 1975, abandoned.

[51] Int. Cl.$^2$ .............................................. C01F 7/08
[52] U.S. Cl. .................................. 423/119; 423/131; 423/137
[58] Field of Search ........................ 423/119, 131, 137

[56] References Cited

U.S. PATENT DOCUMENTS

| 1,376,563 | 5/1921 | Miquet | 423/119 |
|---|---|---|---|
| 1,422,004 | 7/1922 | Sherwin | 423/119 |
| 1,514,657 | 11/1924 | Cowles | 423/119 |
| 1,593,364 | 7/1926 | Cowles | 423/119 |
| 2,964,383 | 12/1960 | Kamlet | 423/119 |
| 3,876,749 | 4/1975 | Horvath et al. | 423/119 |
| 3,989,513 | 11/1976 | Dobos et al. | 423/119 |

OTHER PUBLICATIONS

Conley et al., "Bureau of Mines, R.I.4462" June 1949, pp. 5, 6, 9–14.

Primary Examiner—Herbert T. Carter
Attorney, Agent, or Firm—Glenn, Lyne, Gibbs & Clark

[57] ABSTRACT

A process is disclosed for recovering the caustic and alumina values from high iron-containing Bayer red mud utilizing the so-called lime-soda-sinter process wherein a carbonaceous material such as coke is included in the sintering operation and leaching is carried out without any intermediate iron separation step.

6 Claims, No Drawings

PROCESS FOR RECOVERING SODA AND ALUMINA VALUES FROM RED MUD

This application is a continuation of Ser. No. 593,109, filed July 3, 1975 and now abandoned.

BACKGROUND OF THE INVENTION

Alumina values can be recovered from aluminiferous ores in a variety of ways. One widely utilized process is the well known Bayer process which involves digestion of the aluminiferous ore in a caustic solution at elevated temperatures. The digestion results in a caustic aluminate solution and a caustic insoluble residue commonly called "red mud." In the usual Bayer process, the caustic aluminate solution is separated from the red mud and subjected to precipitation to enable recovery of the alumina values. The red mud, which also contains occluded or trapped caustic soluble alumina values is generally washed to remove most of these values from the mud in order to improve the yield of the Bayer process.

However, in many instances, the red mud also contains considerable quantities of alumina which, under conditions of the Bayer process, is unavailable to caustic extraction processes and constitutes unrecoverable values. This is particularly true when the ore which is subjected to the Bayer processing has an appreciable quantity of silica because the silica and the alumina react during the Bayer process to form an insoluble desilication product, thereby causing a loss in alumina and caustic values.

It has been heretofore proposed in the art to subject low iron-containing aluminiferous ores, including the aforementioned red mud to the so-called lime-soda-sinter process. In this process, an alkaline earth compound such as lime, and an alkali metal compound, such as soda ash, is admixed with the red mud and sintered. The function of the alkaline earth compound is to react with the silica and to form an insoluble compound of calcium and silica. The function of the alkali metal compound is to react with the alumina and to form a soluble alkali metal aluminate. After the sintering has been complete, the sinter is then leached for the purpose of recovering therefrom soluble alumina and caustic values.

Although the lime-soda-sinter process has been known in the art, there have been many problems associated therewith in an attempt to arrive at an economic balance between the cost involved in recovering the added values of alumina and alkali, and the cost of the treatment itself. There have also been technical problems in an attempt to recover the maximum amount of alumina and caustic values. Thus, for example, the sintering operation must be carried out in such a manner as to cause fritting or sintering of the particles without substantial fusion or melting of large portions of the mixture. Melting of substantial portions of the mass would interfere with the recovery of the values during subsequent leaching operations, thereby seriously affecting the overall efficiency.

The prior art was aware of various techniques for treating aluminiferous ores having a high iron content. The art was aware that the pressure of high iron oxides content in the ore involved an irretrievable loss of limestone or soda ash reagents and usually resorted to alternate treatments in order to reduce the iron oxide content of the ore. Thus, for example, it is known in the art to incorporate into the lime-soda-sinter treatment process a carbonaceous material which was stated to react with the iron oxides to form magnetic iron which could then be separated by other techniques. Other proposed methods suggested in the art were to use an acid extraction step so as to produce crude alumina contaminated with iron, but which was relatively free of silica and then to subject this product to the lime-soda-sinter process. Quite obviously, the combination of an acid and a caustic process can lead to additional operating expenses. However, the prior art did not devote too much attention to processing a Bayer red mud having a high iron content. Quite obviously, an acid process would destroy the soda values and the heretofore mentioned magnetic separation techniques might have been thought to be too costly.

As is known, a Bayer red mud contains a substantial amount of a zeolitic desilication product admixed with iron, titanium and/or other materials not normally soluble in caustic. The zeolitic material or desilication product generally has a formula expressed as mole ratio of oxide:

$$4\,Na_2O : 3\,Al_2O_3 : 2\,SiO_2 : Y$$

wherein Y is $SO_3$, Cl,OH, and $CO_2$ depending on the impurities in the Bayer liquor from which the zeolite was precipitated. It appears that in the process of this invention, a Bayer red mud acts differently than aluminiferous ores generally.

DESCRIPTION OF THE PREFERRED EMBODIMENTS

This invention is concerned with the recovery of caustic and alumina values from a red mud resulting from the conventional Bayer process wherein the mud or ore contains a substantial quantity of iron and a substantial quantity of silica. The instant process is applicable to Bayer red muds which contain significant quantities of soda which had heretofore been wasted. It has been found that if the $Fe_2O_3/SiO_2$ weight ratio in the mud desired to be processed is above about 0.4, the recoveries of soda and alumina from said sinter utilizing the conventional teachings of the prior art have drastically been reduced. Thus, for reasons which are not completely understood, it has been found that as the iron to silica ratio in the mud desired to be treated increases, the amount of recoverable alumina and caustic decreases.

It has been found that excellent recoveries of both soda and alumina can be obtained by incorporating a carbonaceous substance into said high iron-containing materials and subjecting them to a lime-soda-sinter operation followed by extraction of the sinter.

It is recognized that there have been many processes heretofore suggested in the art which involve the use of a carbonaceous material in dealing with high iron-containing ores. It is also recognized that there has been teachings of including a carbonaceous material in a lime-soda-sinter operation when processing high iron-containing ores. A teaching of this type can be found in U.S. Pat. No. 2,964,383 which, in general, teaches a process for the treatment of high iron-containing ores by incorporating a carbon containing material in a lime-soda-sinter operation. However, the process of said patent involves conversion of the iron oxide present in the material being treated into magnetic iron, followed by separation of the iron via magnetic means and thereafter subjecting the sinter diminished in iron to a conventional leaching operation. In addition, the process of the patent requires the use of sifficient carbon to reduce a substantial portion of the iron oxide to said metallic iron in a reducing atmosphere.

It has now been found, for reasons which are not at all completely understood, that if carbon is included in a lime-soda-sinter operation when processing high iron red mud ores, it is not necessary to separate the iron out prior to the leaching operation in order to obtain good yields of alumina and soda. In fact, it is not necessary to use substantial quantities of carbon and surprisingly good results have been obtained when carbon to $Fe_2O_3$ mole ratios as low as 0.33 were employed.

It was surprising to find that it is not necessary to separate out iron (whether in the form of metal or intermediate compounds — some of which may be magnetic and others not) prior to leaching out the soda and the alumina. It is difficult to explain the mechanism which is occurring in the novel process of this invention, since it is clear from the proportions of carbon which are being used that no significant amount of metallic iron is formed and, yet, there is no appreciable loss of soda values and alumina values with respect to the iron oxide present in the feed material as the prior art expected.

It is immediately apparent that the novel process of this invention represents a significant advance over the heretofore practiced techniques, involving the use of carbon in a lime-soda-sinter operation. In the first place, the process is operable without necessitating the use of magnetic separators, thereby resulting in both reduced operating and capital expenditures.

Secondly, the process of this invention does not require the high level of carbon which was necessary in former operations involving high iron-containing aluminiferous ores nor does it require a reducing atmosphere. Thus, in carrying out the novel process of this invention, a high iron-containing red mud which has an iron oxide to silica ratio greater than 0.4 is admixed with about 2 moles of 2.5 moles of calcium oxide per mole of silica, about 1 mole of $Na_2O$ per mole of alumina and about .33 to about 3 and higher moles of carbon per mole of $Fe_2O_3$ and then subjected to a conventional lime-soda-sinter operation, followed by extraction of the sinter in order to recover alumina and soda values.

It is to be understood that higher ratios of $Na_2O:Al_2O_3$ can be used, i.e. from 1 to about 3, but no apparent benefit is obtained. It is also noted that the "red mud" already has an $Na_2O:Al_2O_3$ ratio of about 1 or higher so that it is usually not necessary to add any additional $Na_2O$.

The novel process of this invention is carried out merely by mixing the red mud with the limestone, soda (conveniently) supplied as soda ash), and carbonaceous material and sintering the same by heating at a temperature of at least 1,500° F and preferably at 1700°–1950° F for a period of time ranging from about a half-hour to about four hours, and preferably from periods of time of about 1–2 hours. Surprisingly, it has been found that carrying out this operation results in a sinter which can be easily leached in order to recover a substantial amount of alumina and caustic values without the necessity of removing iron prior to leaching.

The expression "available $Na_2O$" is intended to mean that amount of alkali which is free to react with alumina to produce sodium aluminate. In general, this amount of soda is arrived at by making allowances for the sulfate content of the mud desired to be treated, i.e. calculating the amount of sodium which would be tied up by the amount of sulfate or any other acid other than alumina present in the mud, and subtracting that amount of soda tied up by the acid from the total amount of soda present. The amount obtained after this subtraction is the free or available soda.

The following examples will illustrate the novel process of this invention.

In each of the examples which follow, a starting mud was used which analyzed as follows:

|  | Weight % | Grams |
|---|---|---|
| LOI | 11.73 | — |
| $SiO_2$ | 20.66 | 10.33 |
| $Fe_2O_3$ | 8.39 | 4.195 |
| $Na_2O$ | 18.66 | 9.33 |
| CaO | 7.16 | 3.58 |
| $Al_2O_3$ | 27.09 | 13.55 |
| $TiO_2$ | 1.68 | 0.84 |
| $SO_4$ | 2.75 | 1.38 |
| $CaO/SiO_2$ | .347 |  |
| $Na_2O/Al_2O_3$ | .623 |  |

EXAMPLE 1

50 grams of the above-described mud was mixed with 29.97 grams of limestone having the following analysis:

|  | (%) | Grams |
|---|---|---|
| CaO | 53.20 | 15.94 |
| $Fe_2O_3$ | 0.36 | 0.11 | and 6.135 grams of $Fe_2O_3$. This raised the $Fe_2O_3/SiO_2$ ratio to 1.0. The mixture was then sintered at 1050° C (1922° F) for one hour to yield 67.3033 grams of sinter. The sinter had the following analysis:

|  | (%) | Grams |
|---|---|---|
| LOI | .35 | — |
| $SiO_2$ | 16.14 | 10.86 |
| $Fe_2O_3$ | 18.33 | 12.34 |
| $Na_2O$ | 14.07 | 9.47 |
| CaO | 30.18 | 20.31 |
| $Al_2O_3$ | 20.39 | 13.72 |
| $TiO_2$ | 1.20 | 0.81 |
| $SO_4$ | 2.13 | 1.43 |
| $CaO/SiO_2$ | 1.87 | — |
| $Na_2O/Al_2O_3$ | .623 | — |

20 grams of the sinter was then leached for 15 minutes with 200 ml of 15 grams per liter NaOH solution. The sample was filtered, washed, dried and then weighed. The filtrate was diluted to 1000 ml and analyzed for $Al_2O_3$. The leach liquor contained 2.07 grams of $Al_2O_3$ and the leached mud analyzed as follows:

| | Leached Mud | |
|---|---|---|
| | Wt. (g) 16.4863 | |
|  | (%) | Grams |
| LOI | 6.44 | — |
| $SiO_2$ | 18.68 | 3.08 |
| $Fe_2O_3$ | 17.94 | 2.96 |
| $Na_2O$ | 6.23 | 1.03 |
| CaO | 36.11 | 5.95 |
| $Al_2O_3$ | 11.91 | 1.96 |
| $SO_4$ | 0.19 | .03 |
| $TiO_2$ | 1.75 | .29 |

In the above example, the $Fe_2O_3/SiO_2$ ratio of the material subjected to sinter was 1.0 (4.195 + 0.11 + 6.135 = 10.44 ÷ 10.33).

The mole ratio of available $Na_2O/Al_2O_3$ was 1.03. This is calculated by multiplying the $SO_4$ content, i.e. 1.38 grams by:

$$\frac{62 \text{ (mol wt. of } Na_2O)}{96 \text{ (mol wt. of } SO_4)} \text{ or } 0.89125 \text{ grams}$$

of $Na_2O$ and subtracting this amount from the total $Na_2O$, i.e. $9.33 - .89125 = 8.44$ grams of free $Na_2O$.

$$\frac{8.44 \text{ grams of } Na_2O}{13.55 \text{ grams of } Al_2O_3} = \frac{.136 \text{ moles } Na_2O}{.132 \text{ moles } Al_2O_3} = 1.03$$

The percent of alumina recovered is calculated as follows:

$$\begin{array}{l}2.07 \text{ g of } Al_2O_3 \\ \text{in leach liquor}\end{array} \times \frac{67.3033}{20} = 6.97 \text{ grams of } Al_2O_3$$

$$\frac{6.97}{13.55} \times 100 = 51.4\% \, Al_2O_3 \text{ Extracted}$$

The overall $Na_2O$ extraction is calculated as follows:

$$\begin{array}{l}1.3 \text{ g } Na_2O \\ \text{in leached mud}\end{array} \times \frac{67.3033}{20} = 3.47 \text{ grams of } Na_2O$$

$$9.33 \text{ grams} - 3.47 = \frac{5.86}{9.33} \times 100 = 62.8\% \, Na_2O$$

In the above example which serves as a control, extremely poor recoveries of alumina and soda were obtained.

EXAMPLE 2

The procedure of Example 1 was repeated with the exception that 2.58 grams of coke (3 weight percent based on charge) was added prior to sintering. The mix was then heated in the identical manner as Example 1 to yield 66.4792 grams of sinter which analyzed as follows:

|  | (%) | Grams |
|---|---|---|
| LOI | .14 | — |
| $SiO_2$ | 16.22 | 10.78 |
| $Fe_2O_3$ | 15.50 | 10.30 |
| $Na_2O$ | 13.35 | 8.88 |
| CaO | 30.50 | 20.28 |
| $Al_2O_3$ | 20.71 | 13.77 |
| $TiO_2$ | 1.90 | 1.26 |
| $SO_4$ | 2.39 | 1.59 |
| $CaO/SiO_2$ | 1.88 | — |
| $Na_2O/Al_2O_3$ | .65 | — |

20 grams of the above sinter was then leached according to the procedure of Example 1. The leach liquor contained 3.027 grams of $Al_2O_3$ and the leached mud analyzed as follows:

| Leached Mud Wt. (g) 14.5865 | | |
|---|---|---|
|  | (%) | Grams |
| LOI | 5.09 | — |
| $SiO_2$ | 21.40 | 3.12 |
| $Fe_2O_3$ | 20.49 | 2.99 |
| $Na_2O$ | 1.24 | 0.18 |
| CaO | 41.48 | 6.05 |
| $Al_2O_3$ | 7.43 | 1.08 |
| $SO_4$ | 0.05 | .01 |
| $TiO_2$ | 2.10 | .31 |

Calculating the above data in like manner as Example 1 showed that alumina recovery was 74.9% and overall $Na_2O$ extraction was 93.5%.

Thus, it can be seen that adding coke prior to sintering increased the yields of alumina and soda values recovered by significant amounts.

EXAMPLE 3

The purpose of this example was to decrease the amount of coke and study its effect on recovery of alumina and soda values.

The process of Example 2 was repeated with the exception that only 1.29 grams of coke was added (1.5 weight percent). All other steps were identical.

66.5050 grams of sinter were obtained analyzing as follows:

|  | (%) | Grams |
|---|---|---|
| LOI | .60 | — |
| $SiO_2$ | 15.74 | 10.47 |
| $Fe_2O_3$ | 15.52 | 10.32 |
| $Na_2O$ | 14.46 | 9.62 |
| CaO | 29.89 | 19.88 |
| $Al_2O_3$ | 20.39 | 13.56 |
| $TiO_2$ | 2.00 | 1.33 |
| $SO_4$ | 1.38 | .92 |
| $CaO/SiO_2$ | 1.90 | — |
| $Na_2O/Al_2O_3$ | .666 | — |

After leaching, the leach liquor contained 3.02 grams of $Al_2O_3$ and the leached mud analyzed as follows:

| Leached Mud Wt. (g) 14.5834 | | |
|---|---|---|
|  | (%) | Grams |
| LOI | 5.42 | — |
| $SiO_2$ | 20.68 | 3.02 |
| $Fe_2O_3$ | 20.50 | 2.99 |
| $Na_2O$ | 2.09 | .30 |
| CaO | 40.26 | 5.87 |
| $Al_2O_3$ | 6.89 | 1.01 |
| $SO_4$ | .04 | .01 |
| $TiO_2$ | 2.45 | .36 |

Calculations based on the above results indicated an alumina extraction of 74.3% and an $Na_2O$ recovery of 89.1%.

EXAMPLE 4

The purpose of this example was to decrease even further the amount of coke and study its effect on recovery of alumina and soda values.

The process of Example 2 was repeated with the exception that only 0.786 grams of coke was added ($C/Fe_2O_3$ mole ratio = 1). All other steps were identical.

66.6558 grams of sinter were obtained analyzing as follows:

|  | (%) | Grams |
|---|---|---|
| LOI | .36 | — |
| $SiO_2$ | 15.74 | 10.49 |
| $Fe_2O_3$ | 15.92 | 10.61 |
| $Na_2O$ | 13.59 | 9.06 |
| CaO | 30.70 | 20.46 |
| $Al_2O_3$ | 20.13 | 13.42 |
| $TiO_2$ | 2.00 | 1.33 |
| $SO_4$ | 2.29 | 1.53 |
| $CaO/SiO_2$ | 2.01 | — |
| $Na_2O/Al_2O_3$ | 0.602 | — |

After leaching, the leach liquor contained 2.78 grams of $Al_2O_3$ and the leached mud analyzed as follows:

|  | Leached Mud Wt. (g) 14.9638 | |
|---|---|---|
|  | (%) | Grams |
| LOI | 5.07 | — |
| $SiO_2$ | 20.06 | 3.00 |
| $Fe_2O_3$ | 21.49 | 3.22 |
| $Na_2O$ | 1.86 | 0.28 |
| CaO | 39.91 | 5.97 |
| $Al_2O_3$ | 8.48 | 1.27 |
| $SO_4$ | 0.12 | 0.02 |
| $TiO_2$ | 2.29 | .34 |

Calculations based on the above results indicated an alumina extraction of 68.5% and an $Na_2O$ recovery of 90.1%.

EXAMPLE 5

The purpose of this example was to decrease even still further the amount of coke and study its effect on recovery of alumina and soda values.

The process of Example 2 was repeated with the exception that only 0.262 grams of coke was added ($C/Fe_2O_3$ mole ratio = 0.33). All other steps were identical.

66.6389 grams of sinter were obtained analyzing as follows:

|  | (%) | Grams |
|---|---|---|
| LOI | 0.41 | — |
| $SiO_2$ | 15.80 | 10.53 |
| $Fe_2O_3$ | 15.92 | 10.61 |
| $Na_2O$ | 13.59 | 9.06 |
| CaO | 30.70 | 20.46 |
| $Al_2O_3$ | 20.13 | 13.41 |
| $TiO_2$ | 2.10 | 1.40 |
| $SO_4$ | 2.32 | 1.55 |
| $CaO/SiO_2$ | 2.00 | — |
| $Na_2O/Al_2O_3$ | 0.60 | — |

After leaching, the leach liquor contained 2.742 grams of $Al_2O_3$ and the leached mud analyzed as follows:

|  | Leached Mud Wt. (g) 14.9948 | |
|---|---|---|
|  | (%) | Grams |
| LOI | 5.55 | — |
| $SiO_2$ | 20.42 | 3.06 |
| $Fe_2O_3$ | 21.09 | 3.16 |
| $Na_2O$ | 1.63 | .24 |
| CaO | 40.22 | 6.03 |
| $Al_2O_3$ | 8.74 | 1.31 |
| $SO_4$ | 0.17 | .03 |
| $TiO_2$ | 2.45 | .37 |

Calculations based on the above results indicated an alumina extraction of 67.5% and an $Na_2O$ recovery of 91.3%.

Examples 2 – 5 clearly demonstrate the increased recoveries of alumina and soda utilizing the process of this invention. As can be seen, utilizing $C/Fe_2O_3$ mole ratios as low as 0.33 gave exceptional results.

The following table summarizes the soda recoveries obtained in the examples:

| Example | Mol Ratio $C/Fe_2O_3$ | Extraction Wt. % Alumina | Extraction Wt. % $Na_2O$ |
|---|---|---|---|
| 1 | 0 | 51.4 | 62.9 |
| 2 | 3.28 | 74.9 | 93.5 |
| 3 | 1.64 | 74.3 | 89.1 |
| 4 | 1.00 | 68.5 | 90.1 |
| 5 | 0.33 | 67.5 | 91.3 |

As can be seen, the examples using a carbonaceous material (Examples 2–5) gave soda recoveries of about 90%.

The carbon-containing material added to the charge may vary considerably in nature and composition. Thus, it may be largely carbon in composition, such as coke, coke breeze, bituminous or anthracite coal, coal dust, coal fines, lignite, peat, charcoal, coal tar, coal tar pitch, wood tar, pitch, etc. The carbon-containing material may be hydrocarbon in nature, such as petroleum, petroleum fractions, fuel oil, mineral oil, petroleum wax, bitumen, petroleum pitch, petroleum coke, etc. The carbon-containing material may also be carbohydrate in nature, such as bagasse residues from sugarcane, wood, wood flour, wood waste, wood processing by-products, molasses, starch residues and wastes, agricultural cellulosic and hemi-cellulosic by-products, residues and wastes, etc.

What is claimed is:

1. In the process of treating a Bayer red mud which has a $Fe_2O_3$ to $SiO_2$ weight ratio of at least 0.4 according to the lime-soda-sinter process wherein said mud is reacted with a source of calcium oxide in order to form a sinter and the sinter is thereafter leached in order to recover sodium aluminate, the improvement which comprises carrying out the sinter operation on a mud which has a $Fe_2O_3$ to $SiO_2$ weight ratio of at least 0.4 and, prior to the sinter operation, adding to said Bayer red mud a quantity of carbon in a carbon-containing material that is substantially less than the quantity of carbon required to reduce a substantial part of said $Fe_2O_3$ to metallic iron and is at least 0.3 moles of carbon per mole of $Fe_2O_3$ and leaching the sinter to recover caustic and alumina values, without removing iron prior to said leaching.

2. The process of claim 1 wherein said mud has an available $Na_2O$ to $Al_2O_3$ mole ratio is about 1.

3. A recovery process for recovering available soda and alumina values from a high iron-Bayer red mud, comprising:
   A. adding from 0.33 to about 3 moles of carbon in a carbon-containing material per mole of $Fe_2O_3$ to said high iron-Bayer red mud to form a mixture;
   B. subjecting said mixture to a conventional lime-soda-sinter operation to form a sinter; and
   C. without prior separation of iron from said sinter, extracting said sinter with an NaOH solution to recover said available soda and alumina values.

4. The recovery process of claim 3 wherein at least 60% of said alumina values in said high iron-Bayer red mud is extracted from said sinter.

5. The recovery process of claim 3 wherein approximately 90% of said available soda is extracted from said sinter.

6. The recovery process of claim 3, wherein said carbon-containing material is selected from the group consisting of materials which are largely carbon in composition, materials which are hydrocarbon in nature and materials which are carbohydrate in nature.

* * * * *